United States Patent Office 2,789,128
Patented Apr. 16, 1957

2,789,128

DIALKOXYDIPHENYLENE BIS-(O-ALKYL CARBAMATE)

Joseph A. Tursich, Akron, Ohio, assignor to Columbia-Southern Chemical Corporation, Allegheny County, Pa., a corporation of Delaware No Drawing. Application January 18, 1954, Serial No. 404,813

4 Claims. (Cl. 260—471)

This invention relates to a novel class of compounds which are polyesters of N-diphenyl polycarbamic acids, notably diesters of N-diphenylcarbamic acids.

The herein contemplated compounds may be considered to be esters of the theoretical acids, diphenyl polycarbamic acids which may be represented by the following formula:

(I)
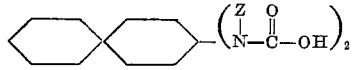

wherein Z is preferably hydrogen but includes monovalent radicals such as aryl, notably phenyl, arylalkyl, alkyl, alkenyl and cycloalkyl and the diphenyl radical contains alkoxy nuclear substituents having up to 5 carbon atoms. Any combination of such nuclear substituents is possible.

The esters themselves may be depicted as:

(II)
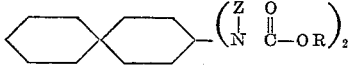

wherein R is the residue of monohydric compounds such as alcohols, Z being as above defined. It should be understood that mixed esters of different monohydric compounds are included, e. g. R may represent the residue of a different monohydric compound in each of the two or more carbamate groups. Also, Z need not be the same monovalent radical in each of the two or more carbamate groups of the novel polycarbamates.

Preferred esters of this class are symmetrical diesters which may be represented as:

(III)

wherein Z is preferably hydrogen or a monovalent radical as defined above in connection with Formula I. R is the residue of a monohydric compound, notably of alcohols containing from 1 to 10 carbon atoms such as methanol, ethanol, isopropanol, amyl alcohol, decanol, etc., as well as halo-substituted alcohols such as chloroethanol. Nuclear substituents on the diphenyl ring, as already described, are also included.

Preparation of these novel compounds may be accomplished by reaction of a haloformate of a suitable alcohol with a diphenyl polyamine wherein each amino group contains at least one reactive hydrogen linked to the nitrogen. The diphenyl polyamine, in an alternative process, may be converted to its polyisocyanate by phosgenation and then reacted with an alcohol to provide these compounds. When mixed esters are desired, such as when R in Formula II differs in each carbamate group, haloformates of mixed alcohols may be employed to effect the esterification in the respective procedures.

In general, the reaction of the haloformate and diphenyl polyamine is effected by reaction of one mole of the haloformate per amino group, e. g. two moles of haloformate per mole of diphenyl diamine. Provision for chemically binding or otherwise physically removing the evolved hydrogen halide is made, usually by incorporating a suitable hydrogen halide acceptor in the reaction medium in sufficient molar quantities to chemically bind all or essentially all the evolved hydrogen halide. This quantity is calculated on the basis that each mole of formed carbamate radical results in the evolution of a mole of hydrogen halide.

Both organic and inorganic hydrogen halide acceptors are suitable. Inorganic basic compounds include oxides, hydroxides, carbonates and bicarbonates of sodium, potassium, calcium, barium, strontium and magnesium or other alkali earth metals or alkali metals. Also organic bases such as pyridine, quaternary ammonium bases typified by trimethyl phenyl ammonium hydroxide are suitable. Inorganic bases are employed as aqueous solution or dispersions. The diphenylene polyamine itself serve as hydrogen halide acceptor by formation of its hydrohalide. If recourse to such expedient is used double the mole requirement of the polyamine is necessary.

The reaction is conducted in the liquid phase, or at least at such temperature that the reactants are liquid, and preferably below 50° C., usually between 0° C. and 25° C. A reaction medium which includes an inert organic diluent such as benzene, halogenated hydrocarbons, notably chlorinated hydrocarbons among which are carbon tetrachloride, perchloroethylene, ethylene dichloride, etc., xylene, toluene and other such diluents which do not react under the conditions (those free from reactive hydroxy or amino groups) is desirable.

Suitable diphenylene polyamines, particularly diphenylene diamines, are those wherein the amino groups contain at least one reactive hydrogen linked to the nitrogen atom and wherein the nitrogen atom is directly attached to a nuclear carbon of the diphenylene radical. Structurally such diphenylpolyamines are represented by this basic structure:

The presence of at least two alkoxy substituents and other non reactive nuclear substituents on the diphenylene radical is included. Typical non-reactive substituents are those which do not contain hydroxy groups or amino groups possessing at least one hydrogen linked to their nitrogen atom.

The diphenylene diamines include ortho dianisidine and those diamines wherein alkoxy such as ethoxy, butoxy, etc. are present in lieu of the methoxy groups of the dianisidine. In addition to the alkoxy nuclear substituent halogens, especially chlorine, cyano, nitro and alkenyl groups may be present.

Monohydric compounds which are used to provide esters herein contemplated include alcohols, preferably those saturated alcohols containing up to 10 carbon atoms such as methanol, ethanol, propanol, isopropanol, the butanols, the octanols and the decanols including decanol-1, decanol-4, 2-ethyloctanol-3 and 2,6-dimethyl-3-methylolheptane. Also halogenated, especially chlorinated, monohydric alcohols including 2-chloroethanol-1, 2-chloropropanol-1, 1-chloropropanol-2, 3-chlorobutanol-2, and the higher molecular weight alkylene chlorohydrins are used. Hydroxy carboxylic acids, more notably the monoethers or esters thereof, likewise are contemplated, and include lactic acid and esters thereof such as ethyl lactate, butyl lactate, etc.; glycollic acid and esters such as methyl glycollate. Other monohydric compounds possessing a reactive alcoholic hydroxy group may also be employed; several such compounds include allyl alcohol, benzyl alcohol, cyclohexyl alcohol and lactonitrile.

These monohydric compounds are converted to haloformates for use in one of the alternative preparations, by phosgenation, e. g. in accordance with U. S. 2,476,637, granted July 19, 1949, or other recognized techniques. The phenylene diamines, in the other process are phosgenated according to accepted practices to provide isocyanates.

The polyesters of N-diphenylene carbamic acids comprising this invention are useful as herbicides, notably as weed killers. Diesters of N-diphenylene carbamic acids are particularly effective.

The following example illustrates the manner in which the contemplated compounds may be prepared.

*Example I*

One mole (244.3 grams) of ortho-dianisidine was mixed with 200 milliliters of water and 1 liter of ethylene dichloride in an ice-cooled 3-liter round bottom, three-necked, flask, equipped with a motor driven agitator and two dropping funnels. To this mixture (2.2 moles) 269.5 grams of 97.1 percent pure isopropyl chloroformate and 352 grams of aqueous NaOH containing 25 percent NaOH by weight was added separately and simultaneously via the dropping funnels over the course of 2½ hours. During this addition, the contents of the flask were vigorously agitated by operation of the agitator; the temperature of the contents was kept between 10 and 16° C. At the conclusion of the reaction, the product was collected by filtration and dried providing 391.0 grams thereof.

A 199 gram portion of this dried product was then recrystallized by Soxhlet-type extraction, using 1500 milliliters of benzene, yielding a grayish crystalline product melting between 185–187° C. Analysis of this 3,3¹-dimethoxy diphenylene bis-(O-isopropyl carbamate) showed 6.75 percent nitrogen in comparison with a calculated value of 6.72 percent.

In lieu of the isopropyl chloroformate of Example I, ethyl chloroformate, 2-chloroethyl chloroformate, n-butyl chloroformate, the chloroformate of ethyl lactate and the chloroformate of lactonitrile may be used to prepare their respective esters.

In formulating these compounds for use as herbicides, it is generally desirable to provide compositions comprising the active ingredient and an inert carrier, either as a liquid or solid. The active ingredient should usually constitute from 0.5 to about 25 or 30 percent of the composition as used in the field, or at least should be present in quantities which permit the applier reasonable latitude in field dosages without undue danger of overdosing.

In providing liquid formulations, these polycarbamates are dissolved in suitable organic solvents notably hydrocarbon solvents such as xylene, toluene, gasoline, kerosene or other hydrocarbons, preferably having a density below that of water, or with alcohols, ethers, ketones and esters normally used as industrial solvents among which are methanol, ethanol, ethyl ether, acetone, etc. A surface active or wetting agent may be included to provide emulsifiable systems with the water immiscible solvents, to provide aqueous emulsions.

Solid formulations, such as dusts, are provided by spraying the polycarbamate onto an absorbent inert carrier such as highly absorptive silica. This coated diluent may be further diluted with various solid extenders including clay, talc, silica, bentonite, diatomaceous earth, chalk, wood, flour, various finely divided silicates such as calcium silicate, and the like. Wettability may be imparted to the solid formulations by addition of recognized wetting agents.

Although the present invention has been described with reference to specific details of certain embodiments thereof, it is not intended that such details shall be regarded as limitations upon the scope of the invention except insofar as enumerated in the appended claims.

I claim:

1. A dialkoxydiphenylene bis-(O-alkyl carbamate) wherein each phenyl group of the diphenylene radical has an alkoxy group linked to one of its nuclear carbon atoms, said alkoxy groups having up to 5 carbon atoms and said alkyl groups containing 1 to 10 carbon atoms.

2. A dimethoxyphenylene bis-(O-isopropyl carbamate) wherein each phenyl group of the phenylene radical has a methoxy group linked to one of its nuclear carbon atoms.

3. 3,3¹-dimethoxydiphenylene bis-(O-isopropyl carbamate).

4. 3,3'-dimethoxydiphenylene 4,4'-(O-isopropyl carbamate).

References Cited in the file of this patent

UNITED STATES PATENTS 2,733,261     Seeger et al. _____ Jan. 31, 1956

FOREIGN PATENTS 506,813     Belgium _____ Nov. 14, 1951

OTHER REFERENCES

Beilstein's Handbuch, 13, 228–9 (1930).